May 29, 1934.  C. McEVOY  1,961,008
AUTOMATIC TIME CONTROLLED ANIMAL FEEDER
Original Filed Aug. 24, 1932   3 Sheets-Sheet 1
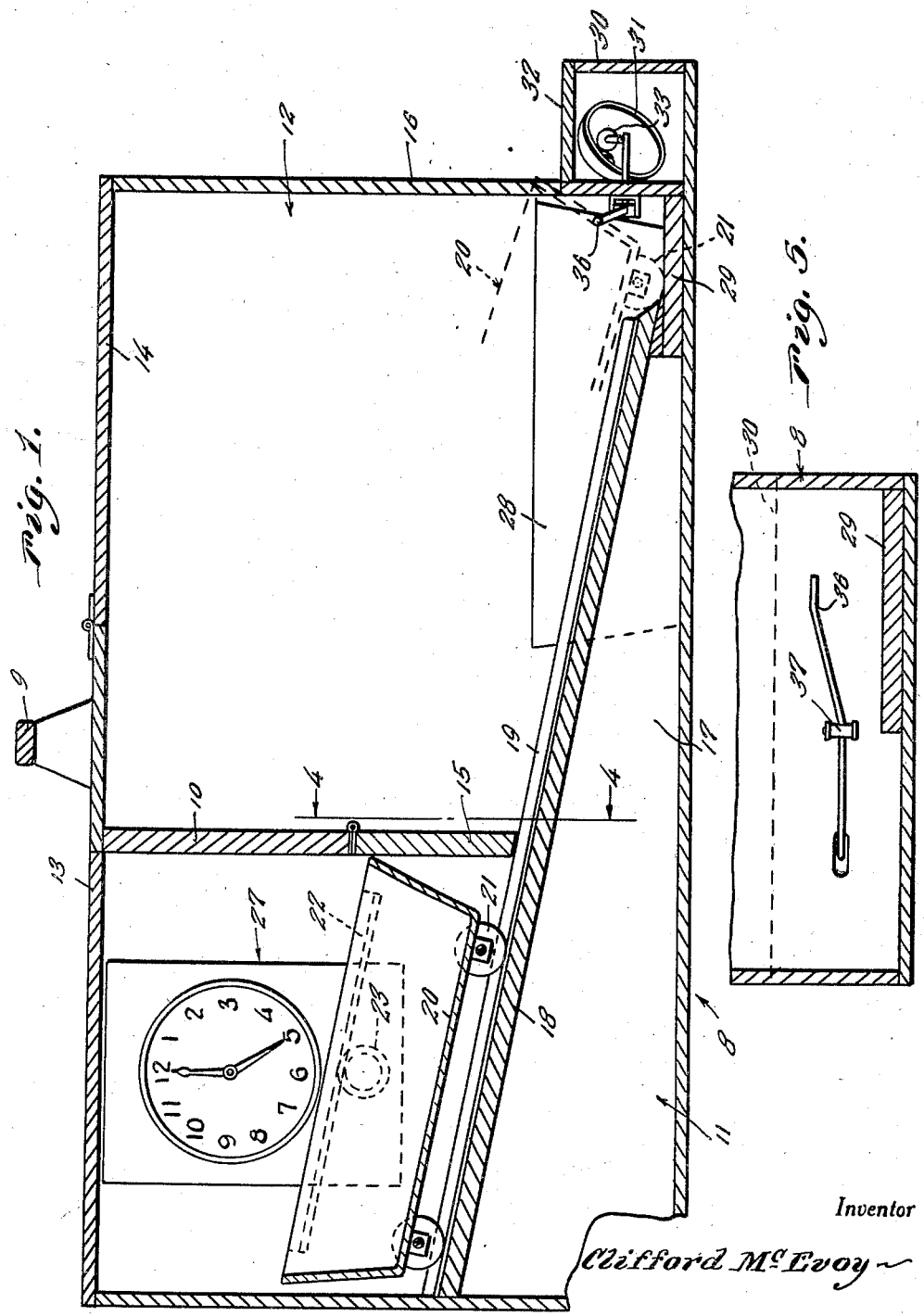
Inventor
Clifford McEvoy
By Clarence A O'Brien
Attorney

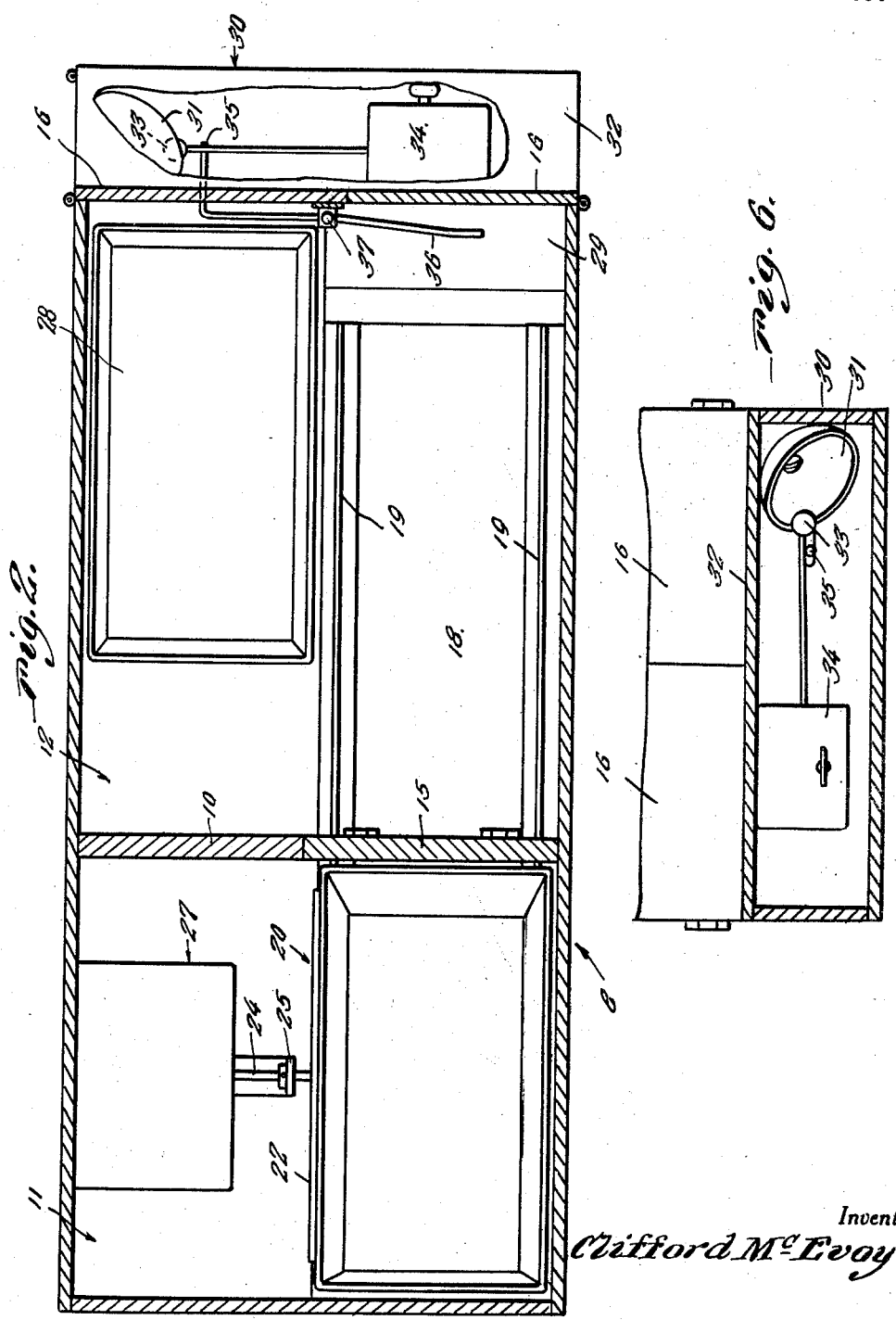

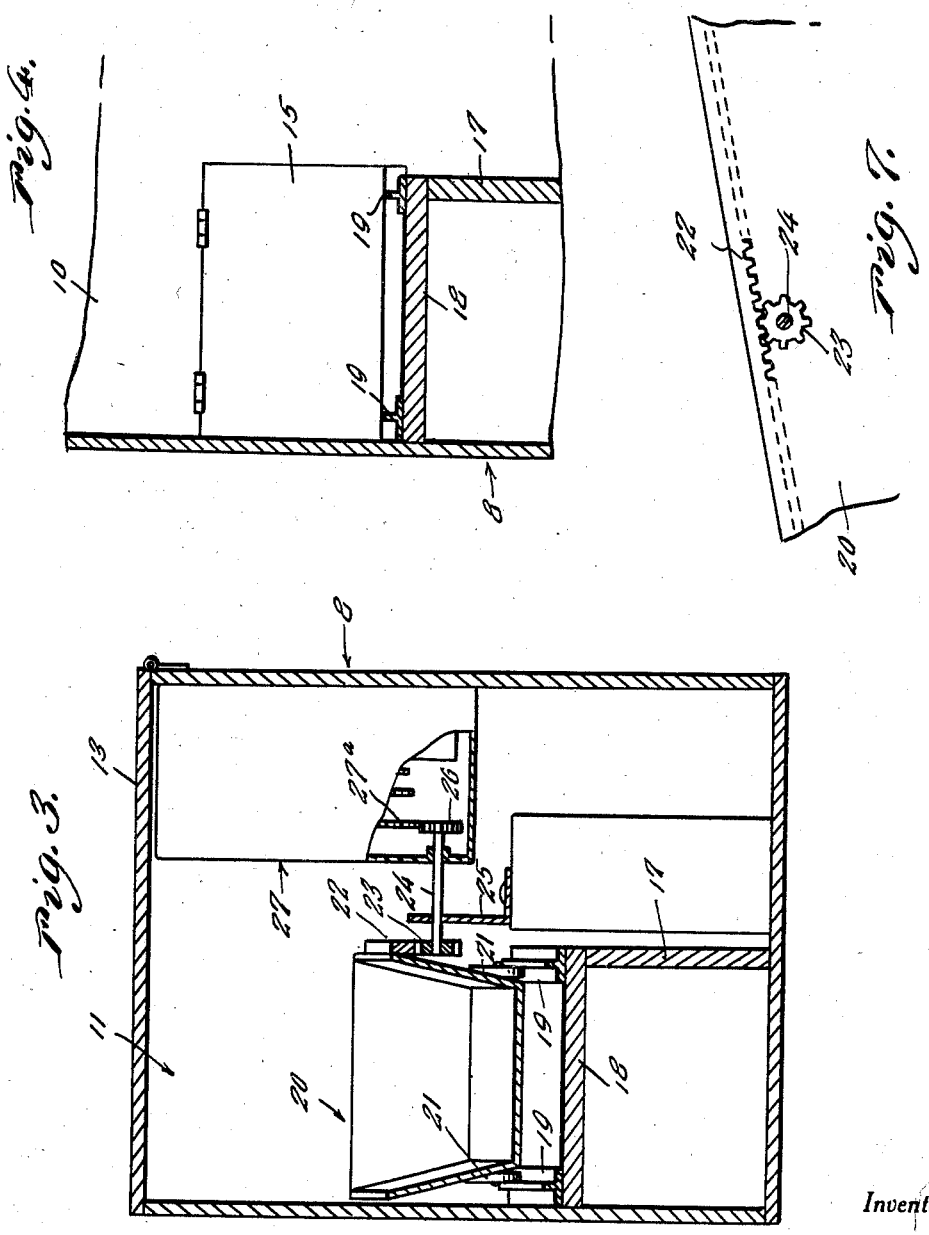

Patented May 29, 1934

1,961,008

UNITED STATES PATENT OFFICE 1,961,008

AUTOMATIC TIME CONTROLLED ANIMAL FEEDER

Clifford McEvoy, Pittsburgh, Pa.

Application August 24, 1932, Serial No. 630,292
Renewed April 18, 1934

3 Claims. (Cl. 161—10)

This invention relates to a novel automatically operable clock controlled feeder for domestic animals, such as for example pet cats and dogs.

Briefly stated, the desired results are accomplished through the use of a portable box having an internal protected mobile tray or pan with supporting means therefor, and clock-controlled mechanism for permitting the pan to move automatically from a predetermined storage position to a conveniently accessible feeding position, whereby to permit a dog's meal to be served at a predetermined time.

In addition to the automatic time-controlled means for the food pan, I have incorporated in the structure an arrangement which permits the pan to actuate and swing the front doors of the protective box to an open position, while at the same time sounding an audible signal or alarm to attract the attention of the dog so that he will known when the meal is being served.

Other features and advantages of the invention will become readily apparent from the following description and drawings.

In the drawings:

Figure 1 is a view in section and elevation illustrating the general arrangement of parts and showing the movable food pan or tray in its normal concealed position.

Figure 2 is a central horizontal sectional and elevational view through the entire structure depicted in Figure 1.

Figure 3 is a transverse vertical section through the rear compartment.

Figure 4 is a detail section on the plane of the line 4—4 of Figure 1.

Figure 5 is a detail view showing the automatically operable trip for the signalling bell.

Figure 6 is a sectional view through the bell housing.

Figure 7 is a detail view of the rack and pinion assembly.

Referring now to the preferred embodiment of the invention as illustrated in the figures of the drawings, it will be seen that the numeral 8 designates a wooden box of general rectangular configuration which is of appropriate proportions to permit it to be conveniently moved from place to place or carried in one's automobile when so desired.

To facilitate carrying the top of the box is equipped with an appropriate handgrip 9. On the interior of the box is a vertical partition 10 defining a rear compartment 11 and a front compartment 12. Both of these compartments are provided with hinged covers or lids 13 and 14 respectively.

The numeral 15 in Figure 1 designates a hinged trap door for the rear compartment while the numerals 16 designate a pair of companion hinged horizontally swingable entrance doors for the front compartment 12. When these doors are swung open convenient access to the automatically served meal is permitted.

The numeral 17 designates a longitudinal partition which serves primarily as a support for the inclined runway 18 which runway is provided with spaced parallel rails 19 forming a track for the food containing and delivering tray or pan 20. This pan is normally maintained at the upper end of the track and in the rear compartment 11 in readiness for operation and the trap door 15 prevents unauthorized access to this compartment.

The tray is provided with suitable transporting rollers or wheels 21 and on one side wall it is formed with a fixed rack 22. The teeth of this rack are in constant mesh with a pinion 23 on one end of an actuating shaft 24. As seen in Figure 3, this shaft is mounted in a bearing bracket 25 and is provided on its opposite end with an operating pinion 26 in mesh with an existing alarm gear 27ᵃ forming a part of the clockwork or mechanism in the alarm clock 27 which is suspended in the rear compartment in the manner shown.

The numeral 28 in Figures 1 and 2 designates a water receptacle also accessible when the front doors 16 swing open under the action of the travelling food pan. At the discharge end of the runway or track is a wear board 29.

The numeral 30 designates a longitudinally elongated box-like housing for the signalling bell 31. This housing is also provided with a hinged closure 32. The bell is sounded by a hammer 33 controlled by mechanism in the casing 34 when released by the latch 35. This latch is formed on the end of a trip arm 36 which, as shown in Figure 2 is pivotally mounted in an appropriate fixture 37. The trip 36 is located in the path of movement of the travelling food pan 20.

In operation the food containing pan 20 is temporarily stood in the rear compartment 11 in readiness to dash by gravity down the track and along the runway 18 at the proper time. The food is placed into the pan by way of the lid 13 and the clock is wound and the alarm set to go off at the requisite time. Obviously, when the alarm goes off the pinion shaft 24 is set into rotation and the action of the pinion 23 starts the pan 20 down on the incline through the medium of the rack bar 22. This opens the trap doors 16.

As the pan reaches the discharge end of the runway it obviously strikes against the front doors 16 swinging these open on their vertical axis. This renders the food in the pan accessible to the animal. Not only does the pan serve to open the doors but it strikes the trip 36 which releases the hammer to the bell and sounds the bell 31 thus automatically calling attention of the dog to the fact that mealtime has arrived.

Particular attention is called to the portability of the signal equipped box with its normally closed entrance doors 16 and the inclined runway having track rails for the gravity actuated travelling food pan 20. This arrangement is desirable in that it permits the pan to automatically move from a normally inaccessible position in the compartment 11 into the front compartment 12 where the food is readily accessible to the animal.

Emphasis is also placed on the desirability of using the pan as the means for automatically tripping the signalling bell and opening the entrance doors 16. Equal emphasis is placed on the provision of the alarm clock 27 and the pinion equipped shaft operatively connected thereto for automatic timed operation and the association of the rack and pinion as seen in Figure 7 for starting the food pan on its initial position to accessible feeding position.

It is thought from the foregoing description that the advantages and novel features of the invention will be readily apparent. It is to be understood that changes may be made in the construction and arrangement of the several parts provided that such changes fall within the scope of the appended claims.

I claim:

1. A domestic animal feeding device comprising a portable box having normally closed entrance doors at one end, an inclined track in said box, a roller equipped food containing and delivering pan movable by gravity on said track from an inaccessible to an accessible position, the pan when assuming the latter position serving to abut said entrance doors in order to swing the doors to an open position, an alarm clock in said box, and an operating connection between the clock and pan for automatically releasing the pan at a predetermined time.

2. A domestic animal feeding device comprising a portable box provided at its front end with hingedly mounted entrance doors, an inclined runway in said box provided with rails forming a track, a roller equipped food containing pan movable along said track by gravity, said pan being provided with a rack bar, an alarm clock supported in said box, a shaft mounted for rotation adjacent the alarm clock and provided on one end with a pinion in mesh with said rack and a pinion on the opposite end mechanically co-related with the clock mechanism for releasing the pan at a predetermined time, said pan when reaching its feeding position serving to automatically force the doors open.

3. A domestic animal feeding device comprising a portable box provided at its front end with hingedly mounted entrance doors, an inclined runway in said box provided with rails forming a track, a roller equipped food containing pan movable along said track by gravity, said pan being provided with a rack bar, an alarm clock supported in said box, a shaft mounted for rotation adjacent the alarm clock and provided on one end with a pinion in mesh with said rack and a pinion on the opposite end mechanically co-related with the clock mechanism for releasing the pan at a predetermined time, said pan when reaching its feeding position serving to automatically force the doors open, an audible signalling bell carried by the box, and trip means for said bell associated with said doors and located in the path of movement of the pan to permit the bell to be automatically sounded at feeding time.

CLIFFORD McEVOY.